(12) United States Patent
Ranganath et al.

(10) Patent No.: US 7,368,062 B2
(45) Date of Patent: May 6, 2008

(54) METHOD AND APPARATUS FOR A LOW PARASITIC CAPACITANCE BUTT-JOINED PASSIVE WAVEGUIDE CONNECTED TO AN ACTIVE STRUCTURE

(75) Inventors: Tirumala R. Ranganath, Palo Alto, CA (US); Jintian Zhu, Palo Alto, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 186 days.

(21) Appl. No.: 10/944,326

(22) Filed: Sep. 17, 2004

(65) Prior Publication Data
US 2006/0062537 A1   Mar. 23, 2006

(51) Int. Cl.
*B29D 11/00* (2006.01)
(52) U.S. Cl. .............................. 216/24; 216/41; 216/74; 216/79; 216/67; 438/455; 438/459
(58) Field of Classification Search ................ 385/131; 359/329; 438/31, 32, 40, 41; 216/24
See application file for complete search history.

(56) References Cited
U.S. PATENT DOCUMENTS

| | | | | |
|---|---|---|---|---|
| 4,656,636 | A | * | 4/1987 | Amann et al. ........... 372/50.11 |
| 5,585,957 | A | * | 12/1996 | Nakao et al. ............... 359/248 |
| 5,796,902 | A | | 8/1998 | Bhat et al. |
| 5,862,168 | A | | 1/1999 | Schilling et al. |
| 2002/0176467 | A1 | * | 11/2002 | Yang et al. .................... 372/50 |
| 2003/0223672 | A1 | * | 12/2003 | Joyner et al. ................. 385/14 |

FOREIGN PATENT DOCUMENTS

| | | | |
|---|---|---|---|
| EP | 0 532 816 A1 | | 3/1993 |
| JP | 2003069136 | | 3/2003 |
| KR | 9305236 B | * | 6/1993 |
| WO | WO 03/032036 A2 | | 4/2003 |

OTHER PUBLICATIONS

Dr. Callon in Microfabrication Cleanroom Session; Dr Gary J Callon; Practical Introduction to Photolithography & Etching.*
Pricipals of Light Generation in Semiconductor Diode Devices; University of Strathclyde, Glassglow; Dec. 25, 2002; www.eee.strath.ac.uk/ug-info/19984/comob3a.pdf.*
PMMA as an etch mask for silicon micromachining—a feasibility study; Bodas et al.; Indo-Japanese Workshop no Microsystem technology; New Delhi; Nov. 2000.*
http://en.wikipedia.org/wiki/Quantum_well; definition; Aug. 2006.*
Vertically tapered polymer waveguide mode size transformer for improved fiber coupling; Chen et al.; 2000 Society of Photo-Optical Instrument Engineers; vol. 39; p. 1507-1516; Jun. 2000.*

(Continued)

*Primary Examiner*—Shamim Ahmed
*Assistant Examiner*—Patricia A. George

(57) ABSTRACT

Undoped layers are introduced in the passive waveguide section of a butt-joined passive waveguide connected to an active structure. This reduces the parasitic capacitance of the structure.

20 Claims, 5 Drawing Sheets

OTHER PUBLICATIONS

Dr. Callon in Microfabrication Cleanroom Session; Dr Gary J Callon; Practical Introduction to Photolithography & Etching, published May 2005.*

Van Zant; Microchip Fabrication; p. 191, 197. 259; McGraw Hill; 3rd ed.; 1997.*

Wayback Machine; http://www.archive.org/web/web.php; printed 2007.*

European search report of Feb. 22, 2006 for Application No. 05006936.8-2216.

J.T. Zhu et al., "Performance comparison between integrated 40 Gb/s EAM devices grown by selective area growth and butt-joint overgrowth", Journal of Crystal Growth, vol. 272, No. 1-4, May 30, 2004, pp. 576-581, XP-002363782.

* cited by examiner

METHOD AND APPARATUS FOR A LOW PARASITIC CAPACITANCE BUTT-JOINED PASSIVE WAVEGUIDE CONNECTED TO AN ACTIVE STRUCTURE

BACKGROUND

Typical methods to fabricate a butt-joined passive waveguide structure involves etching past the active region of the active device to grow the desired waveguide. FIG. 1 shows typical active passive butt joint structure 100. On n-InP base wafer 110, active region 150 is surrounded by separate confinement heterostructure (SCH) layers 145 and 155. P-InP cladding layer 130 and n-InP cladding layer 120 border on SCH layers 155 and 145, respectively. Passive Q-waveguide core 190 is sandwiched between n-InP layer 180 and p-InP layer 185. P-InP layer 160 serves as a cladding layer and p(+)-InGaAs layer 170 serves as a contact layer. To minimize mode mismatch losses at the interface between active region 150 and passive Q-waveguide core 190, the position and composition of passive Q-waveguide core 190 are appropriately selected. The presence of n-InP layer 180 and p-InP layer 185 on either side of passive Q-waveguide core 190 implies that the parasitic capacitance at the interface is determined by the thickness of passive Q-waveguide layer 190 core.

However, when attempting to make a low parasitic electro-absorption (EA) modulator with passive waveguide there is an optimization problem because the parasitic capacitance value is determined by the thickness of passive Q-waveguide core 190. As noted above, the thickness of passive Q-waveguide core 190 is constrained by mode matching issues. These issues typically arise when a passive waveguide needs to be butt joined to an active device requiring low parasitic capacitance such as is typically required in making optical integrated structures.

SUMMARY OF INVENTION

In accordance with the invention, passive Q waveguides are butt-joined to active EA modulators with low parasitic capacitance. While passive-Q waveguide core thickness is still important for minimizing mode mismatch losses, an extra degree of freedom is introduced by sandwiching a passive Q-waveguide between two undoped layers of InP to allow passive Q-waveguide core thickness independent reduction of parasitic capacitance.

DETAILED DESCRIPTION OF THE INVENTION

Figure 2A:
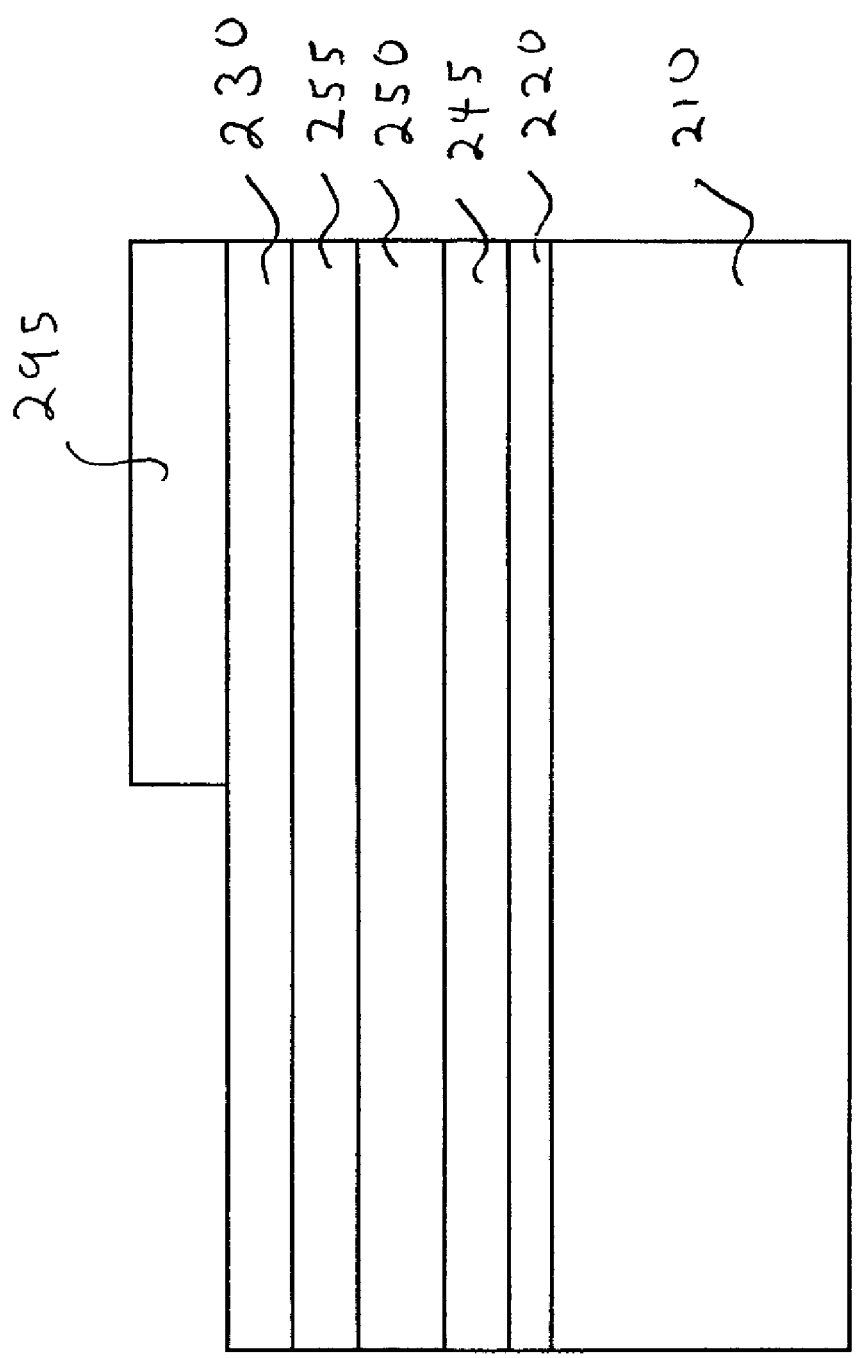
FIGS. 2a-d shows the structure and steps for making a a low parasitic capacitance butt-joined passive waveguide connected to an active structure in accordance with the invention

FIG. 2a shows an embodiment in accordance with the invention. On n-InP base wafer 210, active region 250 along with SCH layers 245 and 255 are grown using MOVCD (metal organic chemical vapor deposition) along with p-InP cladding layer 230 which is typically thicker, about 0.3 μm to 0.5 μm, than prior art p-InP cladding layer 130. SCH layers 245 and 255 typically have about a 1.15 μm bandgap. Typical growth parameters are a growth temperature of about 670° C., a growth pressure of about 76 torr, a V/III ratio of about 200 and a growth rate that is typically about 280 angstroms per minute. More details regarding active EA modulator structure 299 may be found in the patent application "Semiconductor Quantum Well Devices and Method of Making Same" filed Jun. 14, 2004, Ser. No. 10/867,037 and incorporated herein by reference.

Figure 1:
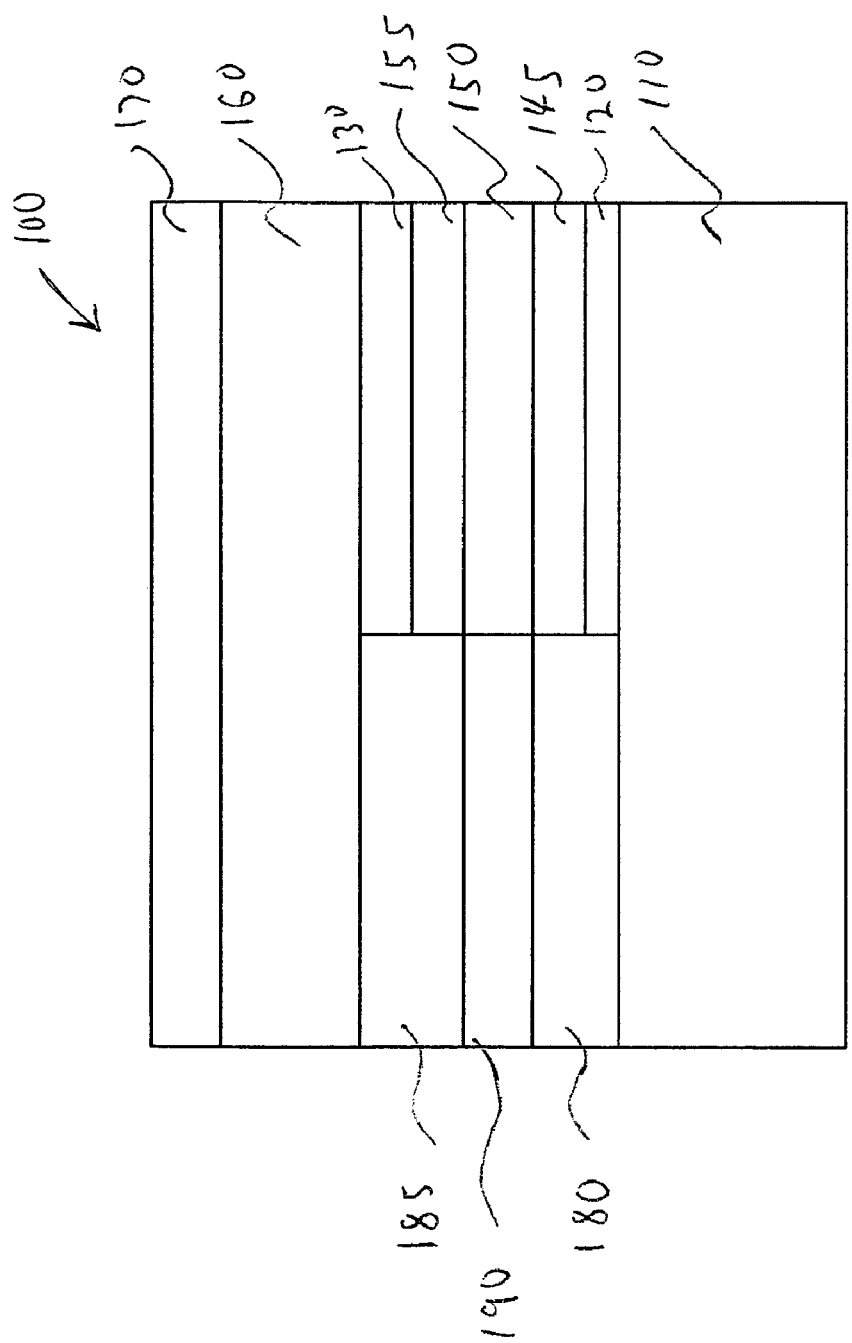
FIG. 1 shows a prior art active-passive butt-joint.
Figure 2B:
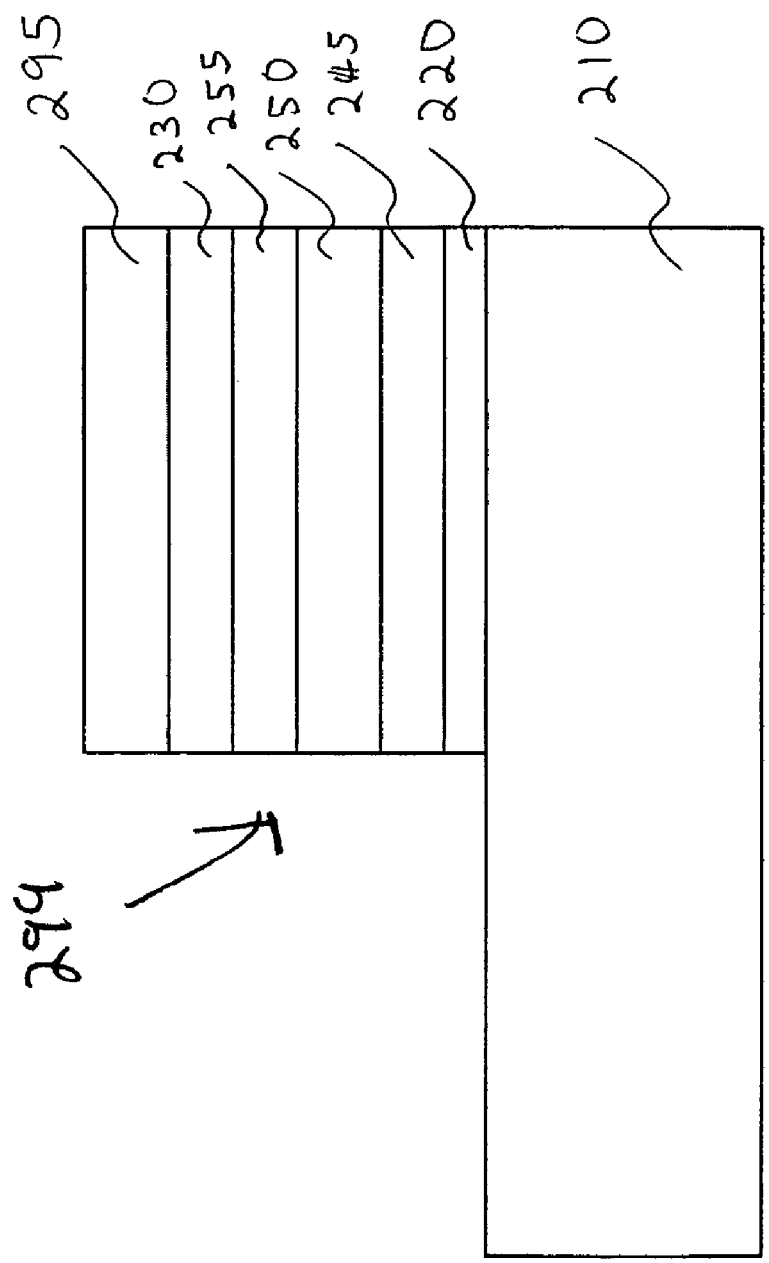
Figure 2C:
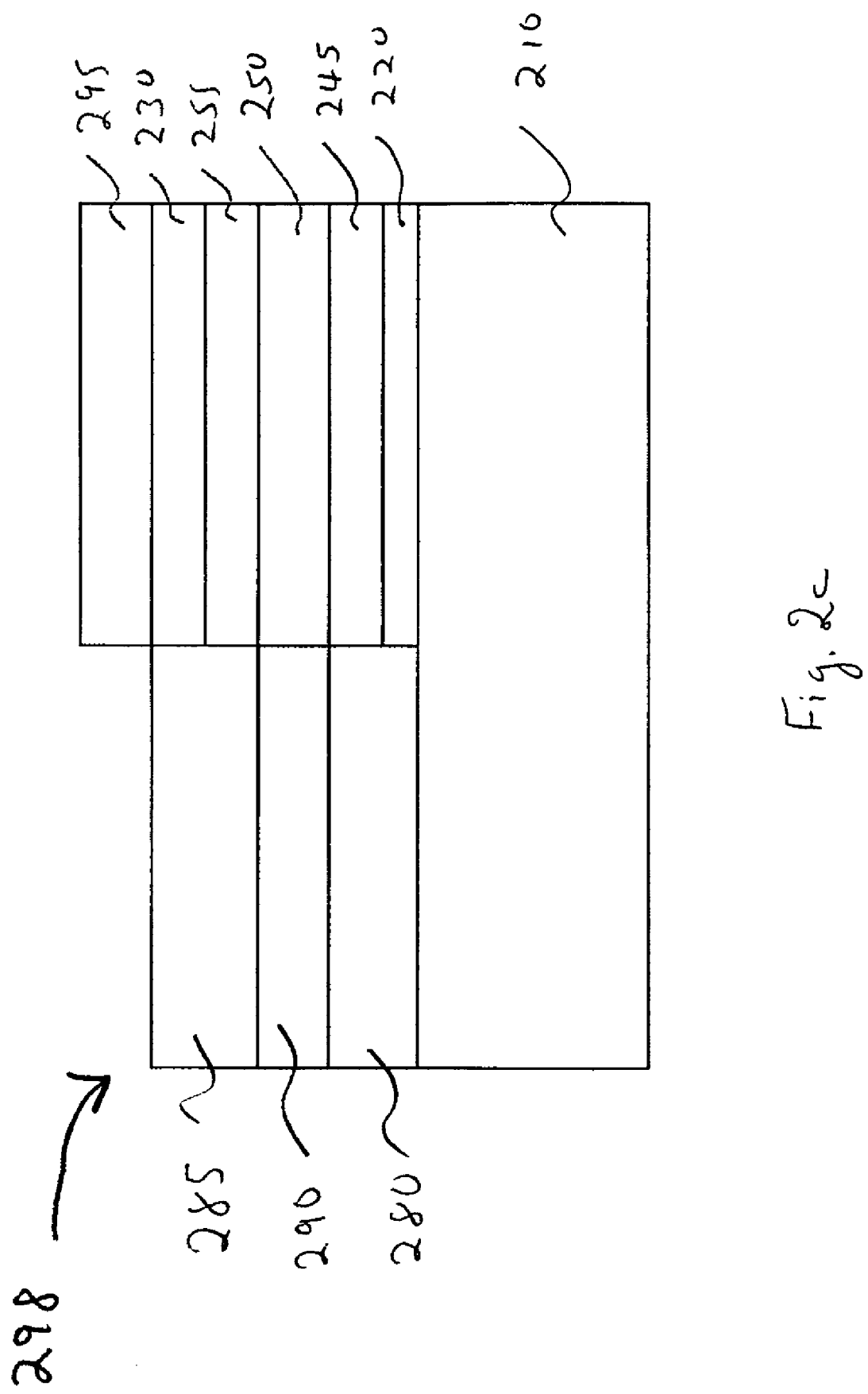
Figure 2D:
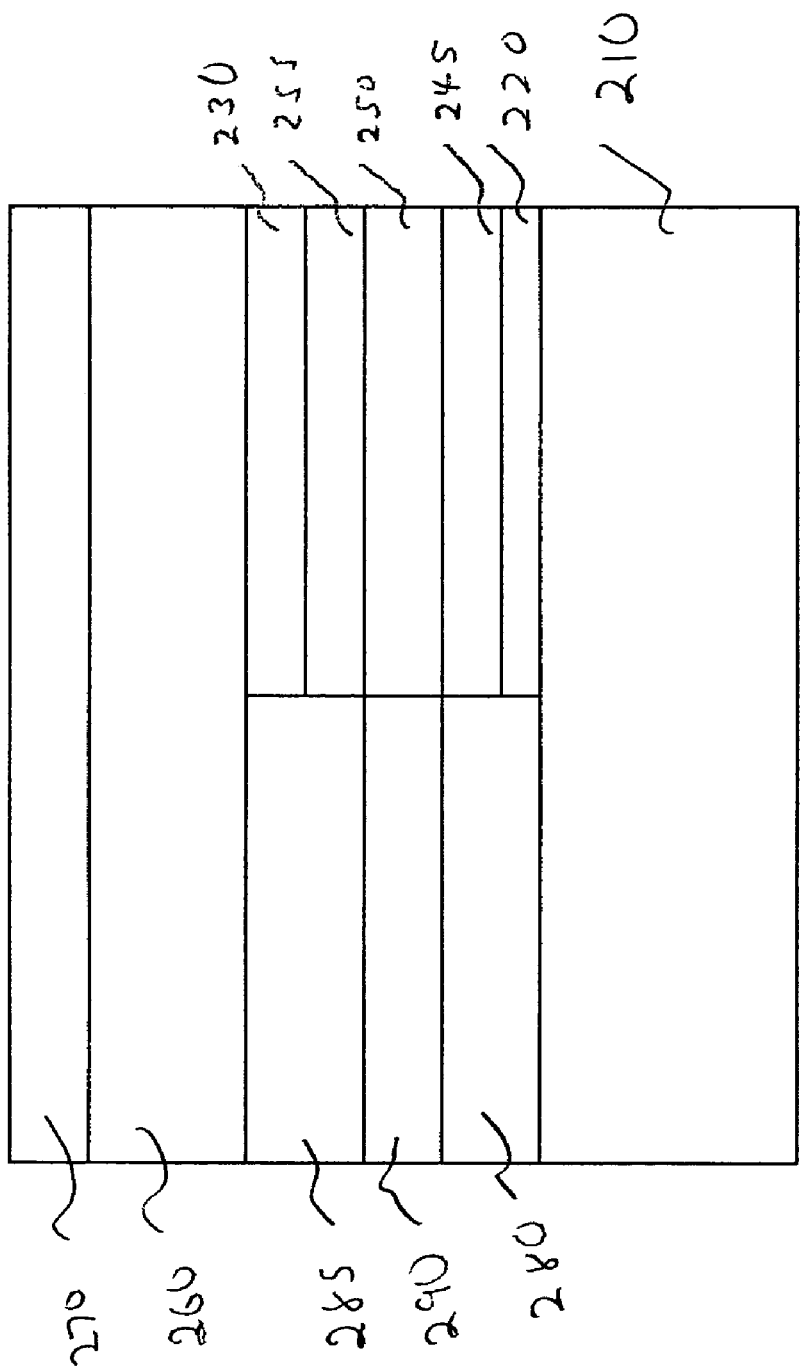

$SiO_2/Si_3N_4$ mask 295 is then defined over part of p-InP layer 230. FIG. 2b shows etching, using for example, dry Cl and Ar RIE (reactive ion etching) and wet Br-methanol etching, of unmasked material to below SCH layer 245. Etching into n-InP material is deeper than for FIG. 1 so that n-InP layer 220 is typically thicker, about 0.3 μm to 0.5 μm than prior art n-InP layer 120 shown in FIG. I. In FIG. 2c, undoped passive Q-waveguide 290 is typically grown using MOCVD along with undoped InP layer 280 and undoped InP layer 285 so that passive Q-waveguide 290 is sandwiched between undoped InP cladding layer 280 and undoped InP cladding layer 285. FIG. 2d shows the final structure incorporating EA modulator structure 299 and passive section 298 in accordance with the invention where $SiO_2/Si_3N_4$ mask 295 has been removed and p-InP upper cladding layer 260 along with p (+) InGaAs contact layer 270 are completed to make a planar device.

The use of undoped InP layer 280 and undoped InP layer 285 increases the depletion region thickness and the application of a reverse bias, typically about −0.5 to −3 volts, results in reduced parasitic capacitance. Depending on the size of parasitic capacitance that is acceptable for a given application, the thickness of undoped InP layers 280 and 285 may be suitably adjusted. Parasitic capacitance can typically drop to about 35 percent if undoped InP cladding layers 280 and 285 are the same thickness as SCH layers 245, 255 and active region 250 together, for example.

The thickness and composition of passive Q-waveguide core 290 may be optimized to achieve a good mode match with active EA modulator structure 299 resulting in the parasitc capacitance due to passive section 298 being reduced in some embodiments in accordance with the invention from about 50 percent to about 10 percent. Note that while this embodiment is discussed with respect to an active EA modulator structure, in accordance with the invention, the active region described may also be the active region of a laser or a receiver, for example. Mode matching typically requires that, first, the axis of symmetry of passive Q-waveguide core 290 and the axis of symmetry for active region 250 are the same distance from substrate 210 and, second, that the optical modes in passive Q-waveguide core 290 and active region 250 be as matched to each other in spatial extent as possible. The second requirement is typically expressed by requiring the overlap integral between the two mode field distributions to be as close to unity as possible.

The cross-sectional dimensions of an active device such as EA modulator structure 299 are typically determined by the performance required. The choice for the cross-sectional dimensions determines the size of the optical mode. The cross-sectional dimensions and the composition of the passive section, such as passive Q-waveguide core 290, are adjusted to maximize the overlap integral. For buried heterostructures, the lateral dimensions of passive section 298 and active EA modulator structure 299, for example, are defined by a single mesa etch resulting in one width for both passive section 298 and active EA modulator structure 299. The height for passive section 298 needs to be selected so that the resulting mode is at the same height as the mode in active EA modulator structure 299. Because the mode size in general depends on the refractive index as well as the thickness of passive Q-wavguide core 290, a quaternary composition for passive Q-waveguide core 290 may be selected whose band-gap energy is larger than the energy corresponding to the propagating wavelength, for example, 1550 nm. In this case, quaternary composition refers to $In_xGa_{1-x}As_yP_{1-y}$, where the x and y values determine the band-gap energy of the particular quaternary composition. The thickness and composition of passive Q-waveguide core 290 assures that the mode sizes match across the interface between the passive waveguide section 298 and the active EA modulator structure 299. The selected composition typically depends on a number of factors. For the purposes of aligning the axes of symmetry of passive Q-waveguide core 290 and of active region 250, the quaternary composition of passive Q-waveguide core 290 is typically selected closer to 1400 nm so that the mode size is slighly larger than the thickness of active region 250. In an embodiment in accordance with the invention, the quaternary composition of passive Q-waveguide core 290 is selected to correspond to 1300 nm. To reduce optical absorption losses, the wavelength corresponding to the band-gap energy of passive Q-waveguide core 290 is typically selected via the quaternary composition to typically be at least 100 nm less than the propagating wavelength, for example, 1550 nm. If the quaternary composition is chosen to have a band-gap energy closer to about 1100 nm, the passive Q-waveguide comprised of passive Q-waveguide core and cladding layers 280 and 285 would be dilute, requiring a thicker passive Q-waveguide core 290 to achieve the correct mode size. This results in a larger thickness difference between passive Q-waveguide core 290 and active region 250. If this approach creates problems in mesa etching and burying epitaxial growth steps the quaternary composition of passive Q-waveguide core 290 may be suitably modified so that the overlap integral is maximized.

The invention is applicable to any situation where a small parasitic capacitance is needed from a butt-joined passive waveguide. Hence, the invention is generally applicable to the building of optical integrated structures. Additionally, the invention is applicable to other III-V semiconductor systems where similar problems of reduced parasitic capacitance arise such as embodiments of 40 Gb receivers, modulators or lasers.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for making an active-passive butt-joint structure for reduced parasitic capacitance comprising:
   providing a III-V semiconductor compound substrate;
   growing an active structure comprised of an active region and two separate confinement heterostructure layers over said substrate;
   applying a mask to protect a portion of said active structure;
   etching away an unprotected portion of said active structure and an underlying portion of said III-V semiconductor compound substrate to produce an exposed surface on said II-V semiconductor compound substrate;
   growing a first undoped III-V semiconductor compound layer over an unprotected portion of said III-V semiconductor compound substrate;
   growing a passive waveguide core having a quaternary composition over said first undoped III-V semiconductor compound layer;
   growing a second undoped III-V semiconductor compound layer over said passive waveguide core; and
   forming a III-V semiconductor compound cladding layer over said active structure and said second undoped III-V semiconductor compound layer.

2. The method of claim 1 wherein a first thickness of said passive waveguide core is selected to mode match to said active structure.

3. The method of claim 1 wherein MOCVD is used to grow said passive waveguide core.

4. The method of claim 1 wherein said first undoped III-V semiconductor compound layer comprises InP.

5. The method of claim 1 wherein said mask is comprised of $SiO_2/Si_3N_4$.

6. The method of claim 1 wherein a second thickness of said second undoped III-V semiconductor compound layer is selected to reduce the parasitic capacitance of said passive waveguide core.

7. The method of claim 1 wherein said active structure comprises an EA-modulator.

8. The method of claim 1 wherein said active structure comprises a receiver.

9. The method of claim 1 wherein said III-V semiconductor compound substrate comprises N-InP.

10. The method of claim 1 wherein said growing said active structure includes growing said active structure comprised of said active region, said two separate confinement heterostructure layers and two cladding layers over said substrate III-V semiconductor compound substrate such that said active region is positioned between said two separate confinement heterostructure layers and said two separate confinement heterostructure layers are positioned between said two cladding layers.

11. The method of claim 10 wherein one of said two separate confinement heterostructure layers and one of said two cladding layers that are positioned below said active region are positioned next to said first undoped III-V semiconductor compound layer.

12. The method of claim 11 wherein one of said two separate confinement heterostructure layers and one of said two cladding layers that are positioned above said active region are positioned next to said second undoped III-V semiconductor compound layer.

13. A method for making an active-passive butt-joint structure for reduced parasitic capacitance comprising:
   providing a III-V semiconductor compound substrate;
   growing an active structure comprised of an active region, two separate confinement heterostructure layers and two cladding layers on said III-V semiconductor compound substrate;
   applying a mask to protect a portion of said active structure;
   etching away an unprotected portion of said active structure and an underlying portion of said III-V semiconductor compound substrate to produce an exposed surface on said III-V semiconductor compound substrate;

growing a first undoped III-V semiconductor compound layer on said exposed surface of said III-V semiconductor compound substrate;

growing a passive waveguide core having a quaternary composition on said first undoped III-V semiconductor compound layer;

growing a second undoped III-V semiconductor compound layer on said passive waveguide core; and forming a III-V semiconductor compound cladding layer on said active structure and said second undoped III-V semiconductor compound layer.

14. The method of claim 13 wherein a first thickness of said passive waveguide core is selected to mode match to said active structure.

15. The method of claim 13 wherein MOCVD is used to grow said passive waveguide core.

16. The method of claim 13 wherein said first undoped III-V semiconductor compound layer comprises InP.

17. The method of claim 13 wherein a second thickness of said second undoped III-V semiconductor compound layer is selected to reduce the parasitic capacitance of said passive waveguide core.

18. The method of claim 13 wherein said active structure comprises an EA-modulator.

19. The method of claim 13 wherein one of said two separate confinement heterostructure layers and one of said two cladding layers that are positioned below said active region are positioned next to said first undoped III-V semiconductor compound layer.

20. The method of claim 19 wherein one of said two separate confinement heterostructure layers and one of said two cladding layers that are positioned above said active region are positioned next to said second undoped III-V semiconductor compound layer.

\* \* \* \* \*